United States Patent
Usuki

(10) Patent No.: US 6,869,688 B2
(45) Date of Patent: Mar. 22, 2005

(54) MAGNETIC RECORDING MEDIUM

(75) Inventor: Kazuyuki Usuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/385,622

(22) Filed: Mar. 12, 2003

(65) Prior Publication Data

US 2003/0175555 A1 Sep. 18, 2003

(30) Foreign Application Priority Data

Mar. 13, 2002 (JP) .................................... P.2002-068793

(51) Int. Cl.$^7$ ............................. G11B 5/66; G11B 5/70; H01J 1/00
(52) U.S. Cl. ...................... 428/611; 428/668; 428/670; 428/336; 428/337; 428/900; 428/694 TS; 428/694 TM; 428/694 TP; 428/694 SL; 428/694 SG
(58) Field of Search ................ 428/694 TM, 694 TS, 428/336, 900, 668, 694 TP, 694 SL, 337, 694 SG, 611, 670

(56) References Cited

U.S. PATENT DOCUMENTS

| | | | |
|---|---|---|---|
| 4,902,583 A | | 2/1990 | Brucker et al. |
| 5,604,030 A | * | 2/1997 | Yamane et al. ............. 428/332 |
| 5,750,270 A | * | 5/1998 | Tang et al. ................. 428/611 |
| 5,875,169 A | * | 2/1999 | Hatwar ....................... 369/272 |
| 5,906,885 A | * | 5/1999 | Yoshimura et al. ......... 428/212 |
| 5,989,728 A | | 11/1999 | Coffey et al. |
| 6,177,208 B1 | | 1/2001 | Yamamoto et al. |
| 6,534,206 B1 | * | 3/2003 | Kirino et al. ......... 428/694 SC |
| 6,627,301 B2 | * | 9/2003 | Shimizu et al. ............. 428/212 |

FOREIGN PATENT DOCUMENTS

| | | |
|---|---|---|
| EP | 0 538 823 A2 | 4/1993 |
| EP | 0 751 502 A2 | 1/1997 |
| WO | WO 01/22407 A1 | 3/2001 |

OTHER PUBLICATIONS

European Search Report dated Oct. 16, 2003.

* cited by examiner

Primary Examiner—Holly Rickman
(74) Attorney, Agent, or Firm—Sughrue Mion, PLLC

(57) ABSTRACT

A magnetic recording medium comprising a flexible support and a magnetic layer selected from a cobalt/palladium multilayer film and a cobalt/platinum multilayer film.

8 Claims, No Drawings

MAGNETIC RECORDING MEDIUM

FIELD OF THE INVENTION

This invention relates to a metal-evaporated thin film magnetic recording medium and more particularly to a magnetic recording medium capable of perpendicular magnetic recording.

BACKGROUND OF THE INVENTION

Recent popularization of the internet has diversified the use of personal computers, including processing of large volumes of moving image or sound data. With this trend, the demand for magnetic recording media, such as hard disks, with increased memory capacity has ever been increasing.

Currently spread hard disc drives adopt a longitudinal recording system in which a magnetic recording layer is magnetized in its running direction. It is said that the longitudinal recording system has limitations in density on account of the thermal fluctuation phenomenon that heat can cause data loss. In contrast, perpendicular magnetic recording in which a recording medium is magnetized in the direction perpendicular to the disk plane is expected as a next generation recording technology for achieving high density. A cobalt-chromium alloy (Co—Cr) is regarded as a promising magnetic material for realizing perpendicular magnetic recording.

In a hard disk drive, a magnetic disk is magnetized (recorded) with a magnetic head which flies from the magnetic disk on rotation of the magnetic disk. Thus, the magnetic head is prevented from coming into contact with the disk (head crash) and damaging the disk during high-speed rotation. The floating height of the magnetic head has been decreasing with the increasing recording density. Today, a floating height as small as 10 to 20 nm has been realized by using a magnetic disk having a magnetic layer on a super smooth and mirror-polished glass support.

The perpendicular magnetic recording is expected to achieve a further increased density. On the other hand, a higher density results in weaker signals of reproduction, which are less detectable. Therefore, in order to establish perpendicular magnetic recording technology on a hard disk drive, it is necessary to further decrease the distance between the disk and the head to improve reproduction ability.

However, since magnetic recording must be conducted in a non-contact mode so as to protect the disk from the shock of a head crash, it is difficult to reduce the flying height any more.

The state-of-the-art flexible disks have insufficient durability for perpendicular magnetic recording, and magnetic heads heretofore proposed for use in perpendicular magnetic recording are not fit for flexible disks.

SUMMARY OF THE INVENTION

An object of the present invention is to provide a flexible and removable magnetic recording medium which assures stable running and is capable of perpendicular magnetization for achieving high-density recording.

Another object of the invention is to provide a removable magnetic recording medium which can be produced economically.

The above objects are accomplished by a magnetic recording medium comprising a flexible support having formed on at least one side thereof a magnetic layer selected from a cobalt/palladium multilayer film and a cobalt/platinum multilayer film.

DETAILED DESCRIPTION OF THE INVENTION

Because the magnetic recording medium of the invention uses a flexible support, the shock on contact with a magnetic head would be absorbed to make the head and the disk slide stably thereby assuring stable running. Besides, the use of a flexible support makes it possible to produce the medium at lower cost.

Having a cobalt/palladium multilayer film or a cobalt/platinum multilayer film as a magnetic layer, the magnetic recording medium of the invention is capable of perpendicular magnetization that realizes high-density recording. Compared with general CoCrPt-based perpendicular magnetic layers, the multilayer structure of the present invention exhibits higher magnetic anisotropy in the vertical direction. As a result, the magnetic recording medium is resistant against thermal fluctuation, capable of stably maintaining small magnetic patterns and therefore excellent in high-density recording characteristics.

The cobalt/palladium multilayer film or cobalt/platinum multilayer film is a stack of alternating cobalt thin films each having a thickness, e.g., of 0.2 nm and palladium or platinum thin films each having a thickness, e.g., of 0.8 nm deposited to a height of ten to several tens of the thin films in total. It is considered that perpendicular magnetic anisotropy develops by the lattice strain of cobalt in contact with palladium or platinum. Although the flexible support, being less thermally resistant than a glass support, etc., is not allowed to be heated for magnetic layer formation, sufficient magnetic characteristic can be guaranteed even when the multilayered structure is formed at around room temperature. That is, the support, while flexible, is protected from deformation. It follows that axial runout of the spinning disk is reduced so that the head/disk contact is weakened, and the durability is improved. In contrast, because the conventional CoPt, CoCr or like vertical films must be formed while heating a support in order to secure sufficient coercivity, deformation of the support has been a problem.

The cobalt film preferably has a thickness of 0.10 to 1.00 nm, particularly 0.15 to 0.50 nm. A thinner cobalt film will lose magnetic properties, and a thicker one will have reduced coercivity, leading to increased noise. The platinum or palladium film preferably has a thickness of 0.10 to 2.0 nm, particularly 0.40 to 1.20 nm. A thinner platinum or palladium film has reduced perpendicular magnetic anisotropy, resulting in output reduction or noise increase. A thicker one has reduced magnetization, resulting in output reduction. The multilayered magnetic layer preferably has a total thickness of 10 to 50 nm, particularly 15 to 40 nm. The cobalt films and the platinum or palladium films are stacked until a desired total thickness as a magnetic layer is reached. The coercive force of the magnetic layer in the vertical direction can be controlled by designing the layer structure and controlling film forming conditions hereinafter described. A preferred coercive force of the magnetic layer ranges from 1500 to 4000 Oe ($\approx$120 to 320 kA/m)

It is known that the cobalt/palladium or cobalt/platinum multilayer film exhibits very strong magnetic exchange coupling in in-plane directions. There are cases where writing very small magnetic signals with a magnetic head encounters difficulty, resulting in very high noise. In such cases, it is advisable to add a non-magnetic element into the cobalt or palladium or platinum film to isolate magnetic particles or to form a columnar structure by providing an underlayer as described infra. Non-magnetic elements which can be added into the cobalt film or the palladium or platinum film include boron, silicon, carbon, aluminum, chromium, and nickel, with boron, boron oxide, silicon or silicon oxide being preferred. A silica-doped cobalt (Co—SiO$_2$)/palladium multilayer film is among such structures. In this particular example, a recommended amount of silica is 2 to 20 mol %, especially 5 to 15 mol %. A smaller amount produces an insubstantial effect, and a larger amount induces reduction of magnetization, resulting in noticeable reduction of output.

The magnetic layer can be provided on both sides of the flexible support via an underlayer. Materials of the underlayer include palladium, platinum, titanium, and carbon. Where a columnar structure is formed to weaken the in-plane magnetic exchange coupling, it is preferred to dope the metal with a non-magnetic element or compound, such as silica, silicon nitride or boron so as to develop a columnar structure in the underlayer. A protective layer for protecting the magnetic layer may be provided on the magnetic layer. It is preferred for the protective layer to have at least one of a hard carbon film or a nitride film made of an inorganic nitride, each of which has the same or higher hardness than the material of a magnetic head.

The magnetic recording medium of the invention is preferably produced by forming the magnetic layer on at least one side of the flexible support by sputtering using cobalt/palladium or cobalt/platinum as targets. The multilayer film can be formed by use of a sputtering apparatus containing the targets, where the support is passed through a film forming zone ahead of the target while rotating at least one of the target and the support.

In what follows, the present invention will be described with particular reference to a disk medium. The same applies to a tape medium.

A disk medium is usually a flexible disk having a hub hole at the center, which resides in a protective shell or jacket made of plastics, etc. The shell usually has a head access aperture through which the magnetic disk is wrote or read. The derlayer as described infra. The dielectric layer is to contrhead access aperture is covered with a metallic shutter.

The magnetic disk generally comprises a flexible and non-magnetic disk support having on each side thereof a stack of an underlayer for controlling magnetic characteristics of a magnetic layer, a magnetic layer capable of magnetically recording information, a protective layer for protecting the magnetic layer from deterioration and wear, and a lubricating film containing a lubricant for improving running durability and corrosion resistance in the order described. Where an optical survo tracking system is adopted, a reflective layer or a dielectric layer can be provided between the support and the unol thermal conduction and thermal diffusion rates and to enhance Kerr effect. Writing and reading information on and from this type of magnetic disks are conducted by the head contact on the magnetic layer side.

In order to conduct servo tracking, the magnetic layer may be preformatted by perpendicular magnetization. For example, where the side of a magnetic layer opposite to the support is used as a recording side, the recording side can be divided into radially alternate regions A where the magnetic layer is magnetized with an S pole facing the support and an N pole facing opposite and regions B where the magnetic layer is magnetized with an N pole facing the support and an S pole facing opposite.

The magnetized regions A and regions B are each formed either concentrically or spirally around the center of the disk to provide respective tracks. That is, the regions A and B serve as not only tracking guides making use of the difference in magnetization direction but recordable regions.

The flexible support is made of a non-magnetic flexible material, such as flexible polymers, in order to avoid the shock on contact with a magnetic head. Useful flexible polymers include aromatic polyimide, aromatic polyamide, aromatic polyamide-imide, polyether ketone, polyether sulfone, polyether imide, polysulfone, polyphenylene sulfide, polyethylene naphthalate, polyethylene terephthalate, polycarbonate, cellulose triacetate, and fluorine resins.

A resin film laminated with the same or a different resin film may be used as a support. Use of a laminated film composed of different kinds of resin films is effective in reducing warpage or waviness of the support per se, whereby axial runout of a spinning disk can be reduced. As a result, the frequency of collisions against a head (head crashes) and the intensity of shocks on a head crash are reduced to avert damage to the magnetic layer. Further, as compared with a magnetic disk having a magnetic layer on both sides of a support, since an intermediate product can be handled with a magnetic layer formed on the support, the magnetic surface is hardly damaged during the production. Furthermore, defects due to film wobbling hardly occur.

Laminating is carried out by hot roll lamination or hot press lamination, or with an adhesive. The adhesive may be applied directly to an adherent or transferred from a release sheet to an adherent. The adhesive is not particularly limited and includes ordinary hot-melt adhesives, thermosetting adhesives, UV curing adhesives, EB curing adhesives, pressure-sensitive adhesives, and anaerobic adhesives.

The thickness of the flexible support is preferably 10 to 200 μm, still preferably 20 to 150 μm, particularly preferably 25 to 80 μm. With a thickness smaller than 10 μm, the disk has reduced high-speed spinning stability, tending to cause increased axial runout. A support with a thickness exceeding 200 μm is so rigid that the shocks on contact with a head are hardly absorbed, which can result in jumping of the head.

The stiffness of the flexible support is represented by Ebd$^3$/12, where E is a Young's modulus; b is a film width; and d is a film thickness. It is preferably 0.5 to 2.0 kgf/mm$^2$ ($\approx$4.9 to 19.6 Mpa), still preferably 0.7 to 1.5 kgf/mm$^2$ ($\approx$6.9 to 14.7 Mpa), with the film width "b" being set at 10 mm.

It is desirable that the surface of the flexible support be as smooth as possible for recording with a magnetic head. Surface roughness of the flexible support significantly influences the signal recording and reproduction performance. Specifically, the flexible support which is adapted to be coated with an undercoating layer described later has a mean surface average roughness $SR_a$ of 5 nm or smaller, preferably 2 nm or smaller, as measured with an optical profilometer and a projection height of 1 μm or smaller, preferably 0.1 μm, as measured with a stylus type profilometer. The flexible support on which a magnetic layer is to be applied directly without an undercoating layer has a mean surface average roughness $SR_a$ of 3 nm or smaller, preferably 1 nm or smaller as measured with an optical profilometer and a projection height of 0. 1 μm or smaller, preferably 0.06 μm or smaller, as measured with a stylus type profilometer.

It is preferred to provide an undercoating layer on the magnetic layer side of the support for improving surface smoothness. Since the magnetic layer is formed by sputtering or a like metal deposition technique, the undercoating layer is required to have heat resistance. Useful materials for forming the undercoating layer include polyimide resins, polyamide-imide resins, silicone resins, and fluorine resins. Thermosetting polyimide resins and thermosetting silicone resins are particularly preferred for their high smoothing effect. The undercoating layer preferably has a thickness of 0.1 to 3.0 µm. Where a laminate film is used as a flexible support, the undercoating layer may be formed either before or after the lamination.

Suitable thermosetting polyimide resins include those obtained by thermal polymerization of an imide monomer containing at least two unsaturated end groups per molecule, such as Bis-allyl-nadi-imide (BANI) series available from Maruzen Petrochemical Co., Ltd. This series of imide monomers are allowed to be applied to the support and then thermally polymerized (set) at relatively low temperatures on the support. Further, they are soluble in universal solvents, which is advantageous for productivity and workability. Furthermore they have a low molecular weight to provide a low viscosity monomer solution, which easily fills up surface depressions to produce high leveling performance.

Suitable thermosetting silicone resins include those prepared by a sol-gel method starting with an organic group-containing silicon compound. Silicone resins of this type has a structure of silicon dioxide with part of its bonds substituted with an organic group. Much more heat-resistant than silicone rubbers and more flexible than a silicon dioxide film, they are capable of forming such a resin film on a flexible support that will hardly suffer from cracks or peel. Since the monomer of these silicone resins is allowed to be applied directly to the support followed by setting, universal solvents are employable to prepare a monomer solution, which easily fills up surface depressions to produce high leveling performance. In addition, the monomer solution can be designed to start polycondensation reaction from relatively low temperatures by addition of a catalyst, such as an acid or a chelating agent. That is, the curing reaction completes in a short time, which enables use of a general-purpose coating apparatus to form a resin film.

For the purpose of reducing the true contact area between the head and the disk thereby to improve sliding properties, it is preferred to provide the surface of the undercoating layer with micro projections. Such a textured profile also improves handling properties of the support. Micro projections can be formed by, for example, applying spherical silica particles or an emulsion of organic powder. In order to secure heat resistance of the undercoating layer, application of spherical silica particles is preferred.

The micro projections preferably have a height of 5 to 60 nm, particularly 10 to 30 nm. Too high micro projections result in increased spacing loss between the head and the medium, which deteriorates signal recording and reproduction characteristics. Too low micro projections produce insubstantial effects in improving sliding characteristics. The density of the micro projections is preferably 0.1 to $100/\mu m^2$, still preferably 1 to $10/\mu m^2$. At too small a density, the sliding properties improving effects are insubstantial. Too high a density can cause the applied fine particles to agglomerate into unfavorable too high projections.

It is possible to fix the micro projections to the support surface with a binder resin. Binder resins are preferably selected from those with sufficient heat resistance, such as thermosetting polyimide resins and thermosetting silicone resins.

Where tracking signals are optically read, a reflective layer can be provided between the flexible support and the magnetic layer to increase accuracy of reading recorded signals or tracking signals as in general magnetooptic disks. Light-reflective substances having high reflectances to laser light are used to form the reflective layer. Such reflective substances include metals and semi-metals, such as Al, Al—Ti, Al—In, Al—Nb, Al—Ta, Au, Ag, and Cu. They can be used either individually or as a combination (mixture or alloy) of two or more thereof. The reflective layer can be formed by depositing the reflective substance on the support by sputtering or electron beam deposition. The thickness of the reflective layer is preferably 10 to 200 nm.

It is preferred to provide an underlayer under the magnetic layer to improve the recording characteristics of the magnetic layer. The underlayer can be formed of palladium, platinum, titanium, carbon, etc. Because the underlayer reduces the initial growth layer of the magnetic layer, recording characteristics with low noise can be obtained. Where a columnar structure is to be formed for lessening in-plane magnetic exchange coupling of the magnetic layer to decrease noise, the metal for forming the underlayer may be doped with a non-magnetic element or compound, e.g., silica, silicon nitride or boron.

The thickness of the underlayer is preferably 10 to 100 nm, still preferably 30 to 60 nm. With a thickness smaller than 10 nm, the intended effect is hard to obtain. An underlayer thicker than 100 nm can result in reduction of surface properties due to particle growth and particle size increase in the underlayer, which will lead to noise increase.

The underlayer can be formed by vacuum film forming techniques, such as sputtering, vacuum evaporation, and chemical vapor deposition (CVD). The film forming conditions and the film thickness should be properly selected so as to obtain moderate surface roughness and a proper crystal structure. A preferred surface roughness in terms of $R_{max}$ of the underlayer is 5 to 20 nm, and a preferred particle diameter is about 1 to 30 nm.

A dielectric layer can be provided between the flexible support and the underlayer. A dielectric layer serves to control the temperature of the magnetic layer during and after irradiation with laser light and also to block migration of substances that participate in corrosion or oxidation of the magnetic layer, such as moisture and oxygen, from the support side. Dielectric materials commonly employed in magnetooptic recording media can be used to form the dielectric layer.

Examples of useful dielectric materials include oxides, such as silica and alumina (Si—O and Al—O), nitrides, such as silicon nitride and aluminum nitride (Si—N and Al—N), sulfides, such as zinc sulfide (Zn—S), phosphides (e.g., nickel phosphide), tantalum silicide (Ta—Si), and carbonaceous materials, such as graphite and amorphous carbon. Particularly preferred are those materials which exhibit anticorrosion, suppress reaction of the metallic material of the magnetic layer with oxygen, and have high thermal conductivity, such as inorganic nitrides, e.g., silicon nitride (Si—N) and aluminum nitride (Al—N), and carbonaceous materials. The dielectric layer can be formed by sputtering, CVD or like thin film forming techniques. The dielectric layer preferably has a thickness of 10 to 200 nm.

Where the magnetic recording medium is used in combination with a single pole head, a backup layer made of a soft magnetic material can be provided between the underlayer and the magnetic layer. Usable soft magnetic materials include Permalloy and Sendust. The backup layer preferably has a thickness of 50 to 500 nm, particularly 50 to 200 nm.

The magnetic layer preferably has a perpendicular coercive force of 1500 to 6000 Oe (≈120 to 480 kA/m). A perpendicular coercive force less than 1500 Oe (≈120 kA/m) fails to assure sufficient electromagnetic characteristics. A perpendicular coercive force exceeding 6000 e (≈480 kA/m) results in insufficient magnetic flux density with an ordinary magnetic head, and it is difficult to achieve magnetic recording without heat assist. In view of balance between stability of magnetic force and ease of magnetic recording, a still preferred perpendicular coercive force ranges 1800 to 5000 Oe (≈144 to 400 kA/m), particularly 2000 to 4000 Oe (≈160 to 320 kA/m).

The magnetic layer preferably has a saturation magnetization of 50 to 800 emu/cc (≈0.063 to 1.0 Wb/m$^2$), still preferably 100 to 400 emu/cc (≈0.13 to 0.50 Wb/m$^2$).

The magnetic layer can be formed by physical vapor deposition (PVD), such as vacuum deposition, sputtering, ion plating, and ion implantation, CVD, and like techniques. Sputtering is particularly preferred for ease of composition control.

Sputtering is typically carried out by DC sputtering or RF sputtering. DC pulse sputtering, RF bias sputtering and reactive sputtering are also employable. In carrying out sputtering, a rotating substrate table holding the support is passed above targets (i.e., cobalt and palladium, or cobalt and platinum) or, to the contrary, a substrate table holding the support is fixed, and rotating targets are passed. In forming the magnetic layer on a support of web form, a requisite number of targets with as many cathodes are placed, and the web is run above the targets, or cobalt and palladium targets or cobalt and platinum targets are superposed alternately, and the web is run above the targets. Since the magnetic layer of the invention can be formed by sputtering at room temperature, the support, while flexible, undergoes no deformation and keeps excellent flatness.

The method of recording tracking signals on the magnetic disk, i.e., the method of preformatting is not particularly restricted. For example, magnetized regions may be written with a magnetic head or by magnetic transfer. The magnetic transfer method is preferred for forming a fine pattern of magnetized regions in a short time.

Magnetic transfer is a method in which a prescribed pattern of magnetization is transferred from a master medium to a slave medium. The master medium comprises a non-magnetic support made of silicon, aluminum, etc. and a magnetic layer made of a ferromagnetic substance having a large magnetic flux density, such as Co or Fe, in the form of projections corresponding to the pattern to be transferred. If necessary, an electrically conductive layer made of a non-magnetic metal such as Cr or Ti may be provided between the support and the magnetic layer. Such a master medium is produced by photofabrication or by means of a stamper used to make optical disks. For example, a master medium is produced by preparing a nickel support having a prescribed pattern formed with a stamper and forming a magnetic layer thereon. The method of forming magnetized regions by magnetic transfer will further be described hereunder.

A slave medium comprises a flexible support having on both sides thereof an unformatted magnetic layer, a protective layer, and a lubricating layer. A direct current magnetic field is applied to the slave medium in a direction A perpendicular to the disk plane to perpendicularly magnetize the magnetic layer of the slave medium (initial magnetization). By this initial magnetization, the entire area of the magnetic layer becomes a magnetized region A.

A master medium is brought into intimate contact with the initialized slave medium, and a direct current magnetic field or an alternating current bias magnetic field is pattern wise applied in the direction B opposite to the direction A thereby pattern wise magnetize the magnetic layer in the direction B. Thus, the magnetic filed is applied from the patterned regions of the master medium in contact with the slave medium to the corresponding area of the slave medium in the direction B. As a result, the magnetization direction in these regions of the slave medium is reversed to form magnetized regions B (magnetized in the direction B) in the magnetized region A. Precise preformatting of the slave medium thus completes.

The protective layer protects metallic materials in the magnetic layer against corrosion and prevents wear of the magnetic disk by pseudo-contact or sliding contact with the magnetic head thereby improving running durability and anticorrosion.

Materials for forming the protective layer include oxides, such as silica, alumina, titania, zirconia, cobalt oxide, and nickel oxide; nitrides, such as titanium nitride, silicon nitride, and boron nitride; carbides, such as silicon carbide, chromium carbide, and boron carbide; and carbonaceous materials, such as graphite and amorphous carbon.

The protective layer preferably has the same or higher hardness than the magnetic head and a stable, long-lasting anti-seizure effect during sliding for exhibiting excellent sliding durability. From the standpoint of anticorrosion, the protective layer is preferably free from pinholes. Where tracking signals are read with a laser, it is preferred that the protective layer be sufficiently transparent to laser light. Among such a protective layer is a hard carbon film called diamond-like carbon prepared by CVD.

The protective layer may have a multilayer structure, a stack of two or more thin films. For example, a dual-layer protective layer having a hard carbon film on the outer side for improving sliding characteristics and a nitride layer (e.g., silicon nitride) on the inner side for improving anticorrosion will promise high levels of anticorrosion and durability.

The lubricating layer, which is provided on the protective layer for improving running durability and anticorrosion, contains known lubricants, such as hydrocarbon lubricants, fluorine lubricants, and extreme pressure additives.

The hydrocarbon lubricants include carboxylic acids, such as stearic acid and oleic acid; esters, such as butyl stearate, sulfonic acids, such as octadecylsulfonic acid, phosphoric esters, such as monooctadecyl phosphate; alcohols, such as stearyl alcohol and oleyl alcohol; carboxylic acid amides, such as stearamide; and amines, such as stearylamine.

The fluorine lubricants include the above-recited hydrocarbons with part or the whole of their alkyl moiety being displaced with a fluoroalkyl group or a perfluoropolyether group. The perfluoropolyether group includes those derived from perfluoromethylene oxide polymers, perfluoroethylene oxide polymers, perfluoro-n-propylene oxide polymers $(CF_2CF_2CF_2O)_n$, perfluoroisopropylene oxide polymers $(CF(CF_3)CF_2O)_n$, and copolymers of these monomer units. A perfluoromethylene-perfluoroethylene copolymer having a hydroxyl group at the molecular end (Fomblin Z-DOL, available from Ausimont) is an example.

The extreme pressure additives include phosphoric esters, such as trilauryl phosphate; phosphorous esters, such as trilauryl phosphite; thiophosphorous esters, such as trilauryl trithiophosphite; thiophosphoric esters; and sulfur type ones, such as dibenzyl disulfide.

These lubricants can be used either individually or as a combination of two or more thereof. The lubricating layer is formed by applying a solution of a desired lubricant in an organic solvent to the protective layer by spin coating, wire coating, gravure coating, dip coating or like coating methods, or by depositing a lubricant by vacuum evaporation. The amount of the lubricant to be applied is preferably 1 to 30 mg/m$^2$, still preferably 2 to 20 mg/m$^2$.

In order to further improve anticorrosion, a combined use of a rust inhibitor is recommended. Useful rust inhibitors include nitrogen-containing heterocyclic compounds, such as benzotriazole, benzimidazole, purine, and pyrimidine, and derivatives thereof having an alkyl side chain, etc. introduced into their nucleus; and nitrogen- and sulfur-containing heterocyclic compounds, such as benzothiazole, 2-mercaptobenzothiazole, tetraazaindene compounds, and thiouracil compounds, and their derivatives. The rust inhibitor may be mixed into the lubricant solution to be applied to the protective layer, or may be applied to the protective layer before the lubricating layer is formed. The amount of the rust inhibitor to be applied is preferably 0.1 to 10 mg/m$^2$, still preferably 0.5 to 5 mg/m$^2$.

The method of recording and reproducing information on and from the magnetic disk will be described hereunder.

Magnetic heads which can be used for perpendicular magnetic recording include those designed for perpendicular magnetic recording, such as a single pole head, and a ring head used in longitudinal magnetic recording. In using a single pole head, it is preferred to provide a backup layer as previously stated. For reproduction, a high-sensitivity magnetoresistive (MR) head or giant magnetoresistive (GMR) head is preferably used.

The magnetic disk is rotated, and the magnetic head is pressed toward the disk, whereby the disk and the head slide in contact with each other with a very weak force in a stable manner. For stable running, the rotational speed of the disk is preferably 1000 to 10000 rpm, still preferably 2000 to 7500 rpm. The axial runout of the disk is preferably as small as possible, particularly about 50 $\mu$m or smaller.

Magnetic recording of information is effected by feeding control signals from a recording magnetic field control circuit to the magnetic head while in the contact sliding state thereby to apply a magnetic field corresponding to the information to the magnetic layer. The recorded information is reproduced by reading the magnetically recorded information similarly in the contact sliding state.

In reproducing tracking signals to carry out servo control, Kerr effect can be made use of as described below. When a perpendicularly magnetized region A with an S pole facing the support and an N pole facing outward is irradiated with linearly polarized light incident on the magnetic layer side, the plane of polarization of the reflected light rotates from that of incident light by a prescribed angle θ (e.g., to the right) by Kerr effect. On the other hand, when the same linearly polarized light enters a magnetized region B with an N polar facing the support and an S pole facing outward, the polarization plane of the reflected light rotates by a prescribed angle −θ (e.g., to the left) by Kerr effect.

On irradiating the magnetic disk with laser light for tracking, the light is reflected on the disk. The reflected light whose polarization plane has rotated by a prescribed angle is detected through, e.g., a polarizer. A relative positional deviation of the magnetic head from the track is detected from the reflected light intensity to accomplish tracking servo control. That is, the concentric or spiral magnetized regions A and B function as tracking guides. Tracking errors can be detected by systems employed in optical disks, such as a push-pull method using a 2-split photodetector, a three beam tracking method, and the like.

As described above, the magnetic disk according to the invention has the following advantages:

(1) As the magnetic disk is configured to be a flexible disk using a resin film, etc. as a flexible support, the shock of a magnetic head crash is averted, and stable contact sliding of the head and the disk is secured.

Recording on a hard disk must be in a non-contact mode, and further reduction of the floating height is hardly expected. In contrast, recording on a flexible disk is in a contact slide mode, which is very effective in a perpendicular magnetic recording system for achieving high-density recording.

A hard disk has a low reliability problem that the magnetic layer is liable to damage by head crashes. In contrast, a flexible disk is capable of being deformed and relaxing the shock of a head crash. Accordingly, a flexible disk achieves contact recording with high reliability.

(2) Being configured as a flexible disk using a flexible support such as a resin film that is less expensive than a glass support or an aluminum support, the magnetic disk can be produced at lower cost.

A hard disk is produced by stacking a magnetic layer, a protective layer, a lubricating layer, etc. on a glass support or an aluminum support of prescribed size that has been mirror polished one by one. To the contrary, flexible disks can be produced by stacking a magnetic layer, a protective layer, a lubricating layer, etc. in a continuous manner on a moving web of a resin film, etc. to obtain a stock, from which disks of desired size are punched out. That is, flexible disks can be produced on a large volume scale, leading to reduction of production cost.

(3) Because the magnetic layer is made up of cobalt and palladium or platinum and has a perpendicular coercive force of 1500 to 4000 Oe (≈120 to 320 kA/m), the magnetic disk of the invention is capable of high-density recording by perpendicular magnetization without heat assist. Further, these materials exhibit high perpendicular magnetic anisotropy, the magnetic layer is strong against thermal fluctuation. It is capable of maintaining very small recording sizes in a stable manner to thereby enjoy excellent high-density recording characteristics.

(4) The magnetic layer can be preformatted to have radially alternating magnetized regions different in magnetization direction. This enables servo tracking control based on the difference in magnetization direction between adjacent magnetized regions. There is no need to form unevenness for servo tracking on a recording medium as in optical disks, and stable running of the medium in sliding contact with a magnetic head can be secured.

(5) Since the magnetization direction of magnetized regions is perpendicular to the disk plane, the magnetized regions having different magnetization directions which alternate with each other in the radial direction do not mutually counteract each other. As a result, each magnetized region stably maintains the magnetism.

While the invention has been described with reference to an embodiment in which a magnetic layer is provided on both sides of a support (two-sided disk), a magnetic layer may be provided on one side of a support. Two one-sided disks may be joined together on their support sides to make a two-sided disk. In this case, since the intermediate product can be handled with a magnetic layer on only one side thereof, the magnetic layer is less susceptible to scratches during production than in the case where a magnetic layer is provided on both sides of a support. Furthermore, defects due to wobbling hardly occur.

With respect to a tracking system, the above-described embodiment adopts a system in which the magnetic disk is preformatted by magnetizing the magnetic layer in a concentric or spiral pattern in such a manner that magnetized regions different in magnetization direction alternate in the radial direction. While other tracking systems are also employable, the system adopted in the above embodiment has the following advantages.

Tracking can be controlled based on the difference in magnetization direction between magnetized regions by making use of, for example, angle of Kerr rotation of reflected light. Tracking can be conducted in a continuous manner by concentrically or spirally magnetizing the magnetic layer around the center of the disk. As a result, accurate tracking servo control is possible. Tracking being based on the difference in magnetization direction between magnetized regions, there is no need to form projections and depressions on a smooth disk support. Even where a recording head is disposed in extreme vicinity of the recording medium, a stable running condition on the head can be realized.

The direction of magnetization for tracking is preferably perpendicular to the disk plane, whereby the magnetized regions having different magnetization directions which alternate with each other in the radial direction do not counteract each other, mutually lessening the magnetic force with each other. As a result, each magnetized region exhibits stabilized magnetism.

It is also conceivable that the magnetic layer is divided into magnetized regions (for example, S-magnetized regions) exclusive for recording information and magnetized regions (for example, N-magnetized regions) exclusive for tracking.

EXAMPLES

Example 1

A 1.0 μm thick undercoating layer of organopolysiloxane was formed on both sides of a polyethylene naphthalate film having a thickness of 63 μm and an average roughness Ra of 1.2 nm. Spherical silica particles (organosilica sol) having a particle size of 18 nm were applied to both undercoating layers to form micro projections at a density of $10/\mu m^2$. The resulting film support was set in a sputtering chamber, and argon was introduced into the chamber to a degree of vacuum of 5 mTorr (≈0.665 Pa). A palladium target was sputtered and deposited on the support at room temperature by DC magnetron sputtering to form a 60 nm thick underlayer. Then, a $Co/SiO_2$ (90/10 by mol %) target and a Pd target were alternately sputtered and deposited on the underlayer while rotating the support to form a multilayered magnetic layer having a thickness of 30 nm, in which $CoSiO_2$ layers each having a deposit thickness of 0.3 nm and Pd layers each having a deposit thickness of 0.7 nm were alternately stacked to build up 30 layers in total. The underlayer and the magnetic layer were formed on both sides of the support.

The support having the magnetic layer was set in a plasma enhanced CVD system. Argon and nitrogen were introduced into the chamber at a volume ratio of 1:1, and RF plasma enhanced CVD was performed using $C_2H_4$ gas as a raw material to form a diamond-like carbon protective layer containing hydrogen and nitrogen to a deposit thickness of 10 nm. A perfluoropolyether lubricant Fomblin Z-DOL (from Ausimont) was applied on the protective layer to a thickness of 1 nm. The resulting coated film was punched into 3.7" disks. Each disk was put into a cartridge Zip 100 (from Fuji Photo Film) to prepare a flexible disk.

The perpendicular coercive force of the resulting flexible disk was obtained from a Kerr hysteresis loop measured with a Kerr effect measuring system. The results obtained are shown in Table 2.

The electromagnetic characteristics of the resulting flexible disk were evaluated as follows. An MR head was loaded on a position 32 mm away from the center while rotating the disk at a speed of 3000 rpm, and signals were recorded at a linear recording density of 130 kFCI and reproduced. The signal output to signal near noise ratio (C/N ratio) was obtained. The results, which are shown in Table 2, were relatively expressed taking the C/N ratio of Example 1 as a standard (0 dB).

Examples 2 to 7 and Comparative Example 1

Flexible disks were produced in the same manner as in Example 1, except for changing the compositions of the magnetic layer and the underlayer and the layer structure as shown in Table 1 below. The results of evaluation are shown in Table 2.

TABLE 1

| | Underlayer | | Magnetic Layer | | |
|---|---|---|---|---|---|
| | Materials | Thickness (nm) | Material | Thickness (nm) | Number of Layers |
| Example 1 | Pd | 60 | $CoSiO_2$/Pd | 0.3/0.7 | 30 |
| Example 2 | Pd | 60 | $CoSiO_2$/Pd | 0.2/0.8 | 30 |
| Example 3 | Pd | 60 | $CoSiO_2$/Pd | 0.4/0.7 | 30 |
| Example 4 | Pt | 60 | $CiSiO_2$/Pt | 0.3/0.7 | 30 |
| Example 5 | Pd | 60 | Co/Pd | 0.3/0.7 | 30 |
| Example 6 | Pd | 40 | Co/Pd | 0.3/0.7 | 30 |
| Example 7 | Pt | 60 | Co/Pt | 0.3/0.7 | 30 |
| Compara. Example 1 | Ti | 60 | CoCrPtB | 30.0 | 1 |

TABLE 2

| | Coercive Force | | Output | Noise | C/N |
|---|---|---|---|---|---|
| | (Oe) | (kA/m) | (dB) | (dB) | Ratio |
| Example 1 | 3000 | 240 | 0 | 0 | 0 |
| Example 2 | 2800 | 224 | −1.8 | −1.5 | −0.3 |
| Example 3 | 3100 | 248 | +0.5 | +1.1 | −0.6 |
| Example 4 | 2700 | 216 | −2.1 | −1.0 | −1.1 |
| Example 5 | 3200 | 256 | +2.5 | +6.2 | −3.7 |
| Example 6 | 2900 | 232 | +2.1 | +6.0 | −3.9 |
| Example 7 | 2600 | 208 | −3.8 | −0.8 | −3.0 |
| Compara. Example 1 | 1200 | 96 | −6.7 | +2.5 | −9.2 |

It is seen that a general CoCrPt perpendicular magnetic layer formed on a polyethylene naphthalate film support without heating the support has a low coercive force, while the magnetic media according to the invention exhibits a high coercive force and an excellent C/N ratio. When a CoCrPt layer was deposited at a support temperature of 200° C., the film underwent considerable deformation, failing to produce a sample disk. Further, a hard disk was prepared in the same manner as in Example 1, except for using a 3.5" mirror-polished aluminum support and compared with the sample of Example 1. As a result, the output and the noise were −2.5 dB and −1.0 dB, respectively, and the C/N ratio was −1.5 dB. This is considered to be because the head floating height is smaller on the flexible disk.

The magnetic recording medium according to the present invention assures stable running on a head and enables high-density recording by perpendicular magnetization. Besides, the magnetic recording medium of the invention can be produced economically.

This application is based on Japanese Patent application JP 2002-68793, filed Mar. 13, 2002, the entire content of which is hereby incorporated by reference, the same as if set forth at length.

What is claimed is:

1. A magnetic recording medium comprising a flexible support containing polyethylene naphthalate or polyethylene terephthalate and having a thickness of 10 to 200 μm, an undercoating layer containing at least one of polyimide resins, polyamide-imide resins, and silicone resins, and fluorine resins, and a magnetic layer selected from a cobalt/palladium multilayer film and a cobalt/platinum multilayer film, wherein the undercoating is located between the support and the magnetic layer, wherein a surface of the undercoating layer has projections having a height of 5 to 60 nm, and a density of the projections is 0.1 to 100 μm$^2$.

2. The magnetic recording medium according to claim 1, wherein the cobalt film has a thickness of 0.10 to 1.00 nm, the palladium film has a thickness of 0.10 to 2.0 nm, and the platinum film has a thickness of 0.10 to 2.0 nm.

3. The magnetic recording medium according to claim 1, wherein a total thickness of the magnetic layer is 15 to 40 nm.

4. The magnetic recording medium according to claim 1, wherein the magnetic layer has a perpendicular coercive force of 1500 to 4000 Oe.

5. The magnetic recording medium according to claim 1, wherein the magnetic layer comprises at least one of boron, silicon, carbon, aluminum, chromium, and nickel.

6. The magnetic recording medium according to claim 1, further comprising an underlayer containing at least one of palladium, platinum, titanium, and carbon.

7. The magnetic recording medium according to claim 1, further comprising a protective layer containing at least one of a hard carbon film and a nitride film containing an inorganic nitride.

8. The magnetic recording medium according to claim 1, wherein the magnetic layer has a saturation magnetization of 50 to 800 emu/cc.

* * * * *